(12) United States Patent
Napierala et al.

(10) Patent No.: US 12,194,493 B2
(45) Date of Patent: Jan. 14, 2025

(54) METHOD OF APPLYING FILAMENT ADHESIVE

(71) Applicant: 3M INNOVATIVE PROPERTIES COMPANY, St. Paul, MN (US)

(72) Inventors: Mark E. Napierala, St. Paul, MN (US); Joel J. Bradley, Woodbury, MN (US); Thomas Q. Chastek, St. Paul, MN (US); Nicholas G. Dyshaw, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 316 days.

(21) Appl. No.: 17/785,552

(22) PCT Filed: Dec. 14, 2020

(86) PCT No.: PCT/IB2020/061912
§ 371 (c)(1),
(2) Date: Jun. 15, 2022

(87) PCT Pub. No.: WO2021/124081
PCT Pub. Date: Jun. 24, 2021

(65) Prior Publication Data
US 2023/0020893 A1   Jan. 19, 2023

Related U.S. Application Data

(60) Provisional application No. 62/951,090, filed on Dec. 20, 2019.

(51) Int. Cl.
*B05D 5/10* (2006.01)
*B05C 5/02* (2006.01)
*B05D 1/26* (2006.01)
*B29C 48/05* (2019.01)
*B29C 48/505* (2019.01)
*B29C 48/92* (2019.01)
(Continued)

(52) U.S. Cl.
CPC .............. *B05D 5/10* (2013.01); *B05C 5/02* (2013.01); *B05D 1/265* (2013.01); *B29C 48/05* (2019.02);
(Continued)

(58) Field of Classification Search
None
See application file for complete search history.

(56) References Cited

U.S. PATENT DOCUMENTS 7,467,452 B2 * 12/2008 Lande .................... B05D 1/265
425/149
8,394,282 B2    3/2013 Panga et al.

FOREIGN PATENT DOCUMENTS

JP    2001292045    10/2001
WO   2019010562 A1   1/2019
(Continued)

OTHER PUBLICATIONS

Encyclopedia of Polymer Science and Technology (1964).
(Continued)

*Primary Examiner* — Mohammad M Ameen
(74) *Attorney, Agent, or Firm* — Vincent Pham

(57) ABSTRACT

Provided are methods and systems for dispensing filament adhesive onto a target substrate. A filament adhesive is applied on a target substrate according to a bead application plan, then the applied bead is checked against performance criteria. A second bead application plan is generated, and subsequent filament bead applied according to the second bead application plan.

20 Claims, 8 Drawing Sheets

(51) Int. Cl.
   *C09J 7/10*   (2018.01)
   *C09J 7/35*   (2018.01)
   *C09J 7/38*   (2018.01)
   *B29K 105/00* (2006.01)

(52) U.S. Cl.
   CPC ............ *B29C 48/507* (2019.02); *B29C 48/92* (2019.02); *C09J 7/10* (2018.01); *C09J 7/35* (2018.01); *C09J 7/385* (2018.01); *B29C 2948/92285* (2019.02); *B29C 2948/92295* (2019.02); *B29K 2105/0097* (2013.01)

(56) References Cited

FOREIGN PATENT DOCUMENTS

| | | |
|---|---|---|
| WO | 2019078813 A1 | 4/2019 |
| WO | 2019164678 A1 | 8/2019 |
| WO | 2019191052 A1 | 10/2019 |
| WO | 2020174394 A1 | 9/2020 |
| WO | 2020174396 A1 | 9/2020 |
| WO | 2020174397 A1 | 9/2020 |

OTHER PUBLICATIONS

International Search Report for PCT Application No. PCT/IB2020/061912 mailed on Mar. 5, 2021, 4 pages.

Mark, Encyclopedia of Polymer Science and Engineering, vol. 13—Poly(Phenylene Ether) to Radical Polymerization, Table of Contents, 3 Pages, (1988).

Satas, "Handbook of Pressure Sensitive Adhesive Technology", 172 (1989).

\* cited by examiner

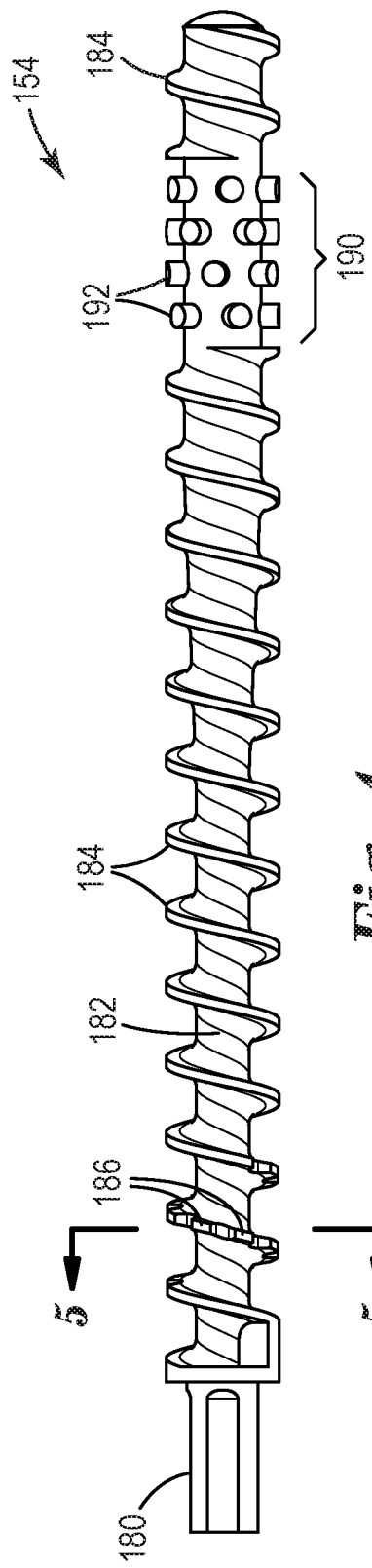
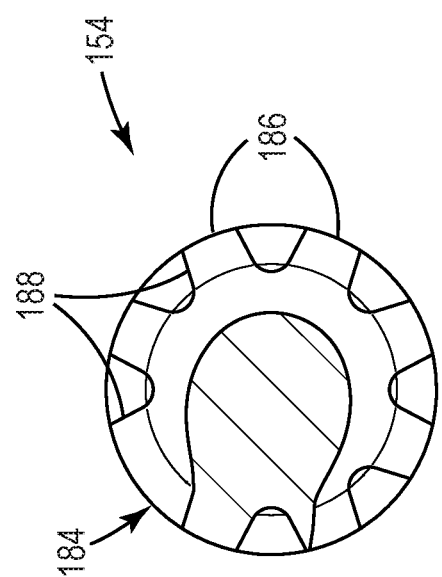
Fig. 4
Fig. 5

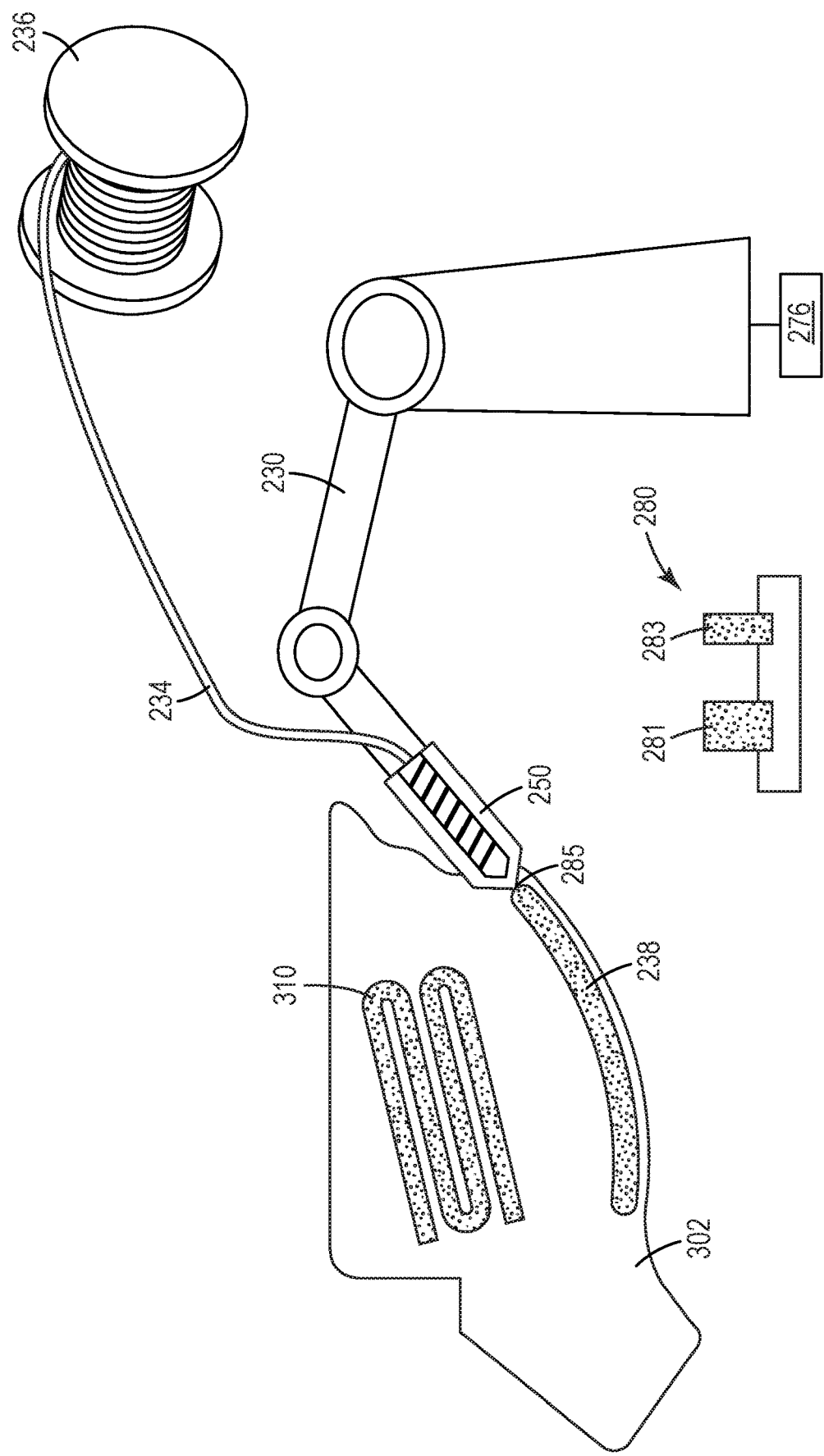

METHOD OF APPLYING FILAMENT ADHESIVE

CROSS REFERENCE TO RELATED APPLICATIONS

This application is a national stage filing under 35 U.S.C. 371 of PCT/IB2020/061912, filed 14 Dec. 2020, which claims the benefit of U.S. Provisional Patent Application No. 62/951,090, filed 20 Dec. 2019, the disclosure of which is incorporated by reference in its/their entirety herein.

FIELD OF THE INVENTION

Provided is a system and method for dispensing filament adhesives, along with components and methods thereof. The provided dispensers can be useful, for example, in applying a pressure-sensitive adhesive to a bonding surface.

BACKGROUND

Pressure-sensitive adhesives are materials that adhere to a substrate upon application of pressure. They do not require solvent, water, or heat to provide an adhesive bond. State-of-the-art pressure-sensitive adhesives can achieve very high bond performance and are capable of replacing traditional mechanical fasteners in many industrial applications. These bonding solutions are also economical and easy to use.

Conventional pressure-sensitive adhesives are thin and flat, and generally dispensed in sheet or roll form. In certain applications, however, it can be advantageous for a pressure-sensitive adhesive to be formed in situ. In automotive bonding applications, for example, the bonding surfaces of a part can be non-planar to provide increased mechanical retention. Some parts can have a ribbed bonding surface that requires significant penetration of the pressure-sensitive adhesive into the ribbed structure to obtain adequate bond strength.

Moreover, one common plastic used in many automotive applications is thermoplastic olefin ("TPO", sometimes referred to as "PP/EPDM") which is a low surface energy plastic similar to polypropylene. Common pressure-sensitive adhesives do not achieve a high degree of "wet out" on these and similar plastics, resulting in reduced surface area between the adhesive and the substrate. Primers and other surface treatments can be used to improve "wet out," but these add to the complexity and cost of bonding. For these reasons, bonding to non-planar low-surface-energy substrates remains a challenging technical problem.

SUMMARY

Provided herein are systems and methods for applying a bead of filament adhesive to a target area using an autonomous robotic application apparatus having a dispense head and an application sensor, communicatively coupled to a computer processor. In one embodiment, the application apparatus comprises a computer processor controlled application arm and the target substrate is stationary; in another embodiment, the application apparatus comprises a moveable substrate coupled to the target substrate, with a stationary dispense head. A first topography of a target substrate is mapped and analyzed to determine a bead application plan as well as performance criteria associated with the application plan. A first bead of extruded core-sheath filament is then applied according to the bead application plan. First sensor input associated with the dispensed first bead is then received and compared against the application plan and performance criteria. On the basis of this analysis, if a threshold level of deviation from a desired geometry or application, a second bead application plan is computed. This second bead application plan may then be executed by the robotic, computer controlled dispense head.

Filament adhesives include those that use a core/sheath configuration, including adhesives that are dispensed in hot melt form and then cooled to provide a pressure-sensitive adhesive. Using the provided dispensing devices, and optionally with the assistance of a computer, these adhesives can be precisely applied to pre-determined locations on a substrate. The ability to customize the size and shape of a pressure-sensitive adhesive provides improved versatility for manufacturers.

Core-sheath adhesives that have a pressure-sensitive adhesive core (i.e., core-sheath PSAs) are differentiated from conventional filaments in several ways. For one, pressure-sensitive adhesives tend to have a relatively soft viscoelastic consistency, which makes it challenging for many traditional FFF (fused filament fabrication) printheads. These materials tend to buckle and/or jam when pushed into a melt zone. Some FFF printheads have added feed tubes or guides that allows for feeding a rubber-based filament. These filaments can be successfully fed, however, primarily because they have Shore A durometers significantly higher than those of typical pressure-sensitive adhesive materials.

Another technical challenge relates to filament adhesive dimensions. Industrial applications that utilize a pumpable adhesive require material delivery speeds of about 4.5-18 kg/hr (10-40 lba/hr). In order to meet these desired throughputs for most industrial applications, the diameter of the provided filament needs to be sufficiently high, generally around six millimeters or more. This can be several times larger than the diameter of traditional filaments used in 3D printers.

Core-sheath PSAs also behave differently from traditional hot melt adhesives. Unlike traditional hot melt materials, core-sheath PSAs retain a high melt viscosity when heated. This is desirable for dimensional stability of the dispensed adhesive on the substrate. Even when molten, these materials will not drip, sag or otherwise migrate from where they are dispensed.

The present disclosure describes a dispensing system that is capable of dispensing filament adhesives such as core-sheath PSAs, according to a bead application plan. Suitable substrates include, but are not limited to, irregular surfaces, complex geometries and flexible media. Additional uses of this pressure-sensitive adhesive include sealing, bonding in tight spaces, patterned adhesive placement, and consumer electronics bonding.

In a first aspect, a dispensing method is described, involving applying a bead of filament adhesive to a target substrate having a substrate topography, comprising receiving, in a processor, digital input defining a bead application plan and performance criteria associated with the substrate topography; providing signals, from the processor, causing a dispensing system with a dispense head to dispense a first set of beads of molten core-sheath filament adhesive according to the bead application plan; receiving, in the processor, first sensor input associated with dispensed first set of beads of extruded core-sheath filament adhesive; analyzing, in the processor, first sensor input in association with the application plan and performance criteria to compute deficiencies associated with the dispensed first set of beads of extruded core-sheath filament adhesive, and creating a second bead application plan to remedy the computed deficiencies; and, providing signals, from the processor, causing the dispensing system with a dispense head to dispense a second set of beads of extruded core-sheath filament to the target substrate according to the second bead application plan.

BRIEF DESCRIPTION OF THE DRAWINGS

FIG. 4 is a side elevational view of a screw component of the dispensing head of FIG. 2;

FIG. 5 is a front cross-sectional view of the component of FIG. 4;

FIG. 8 is a drawing of the target substrate shown in FIG. 7 with two different types of filament adhesives;

Figure 1:
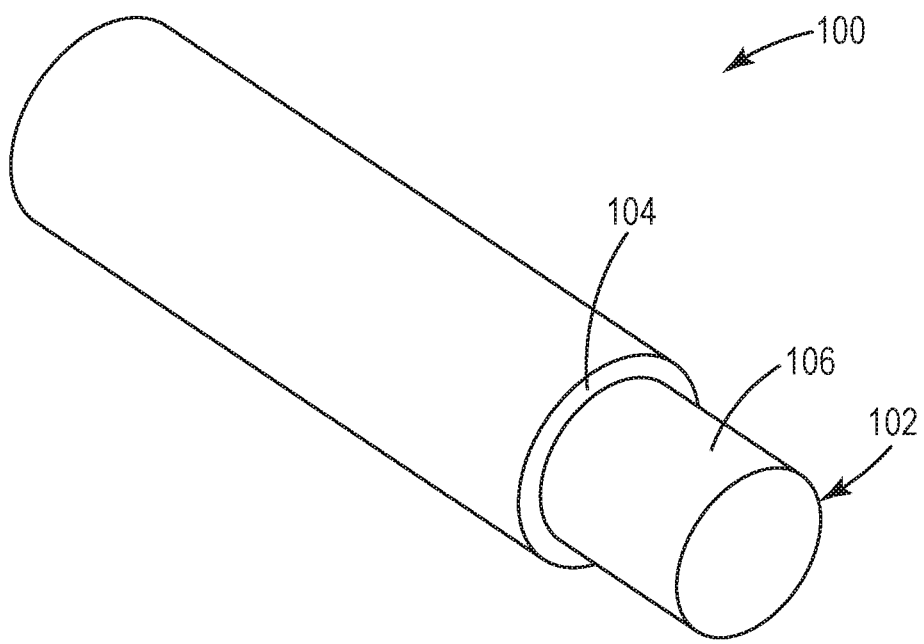
FIG. 1 is a perspective view of a filament adhesive.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

Definitions

As used herein:
"Adhesive bond line" is the adhesive bond area between two adhered parts.
"Ambient conditions" means at a temperature of 25 degrees Celsius and a pressure of 1 atmosphere (approximately 100 kilopascals).
"Ambient temperature" means at a temperature of 25 degrees Celsius.
"Bead" means the filament adhesive as-dispensed. It may have any feasible profile as defined by the dispense head, including circular, oval, ribbon, rectangular, triangular, etc.
"Nominal screw length" refers to the length of the flighted portion of an extrusion screw (the portion that normally comes into contact with the extrudate).
"Non-tacky" refers to a material that passes a "Self-Adhesion Test", in which the force required to peel the material apart from itself is at or less than a predetermined maximum threshold amount, without fracturing the material. The Self-Adhesion Test is described below and is typically performed on a sample of the sheath material to determine whether or not the sheath is non-tacky.
"Pressure-sensitive adhesives" refers to materials that are normally tacky at room temperature and can be adhered to a surface by application of light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). "Pressure sensitive adhesive" or "PSA", as used herein, refers to a viscoelastic material that possesses the following properties: (1) aggressive and permanent tack, (2) adherence to a substrate other than a fluorothermoplastic film with no more than finger pressure, and (3) sufficient cohesive strength to cleanly release from the substrate. A pressure-sensitive adhesive may also meet the Dahlquist criterion described in Handbook of Pressure-Sensitive Adhesive Technology, D. Satas, $2^{nd}$ ed., page 172 (1989). This criterion defines a pressure-sensitive adhesive as one having a one-second creep compliance of greater than $1\times10^{-6}$ cm$^2$/dyne at its use temperature (for example, at temperatures in a range of from 15° C. to 35° C.).

DETAILED DESCRIPTION

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements. It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the particular drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described relating to the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

Assemblies and methods described herein are useful in dispensing adhesives, in molten form, onto a substrate. The dispensed adhesives are optionally pressure-sensitive adhesives. In some embodiments, the dispensed adhesives have a composition that renders unnecessary surface pretreatments or the prior application of a primer on the substrate. The elimination of a pretreatment or priming step saves time and costs, and is of great convenience to the user.

Advantageously, the provided assemblies and methods can use filament adhesives. Filament adhesives are adhesives provided in a continuous thread-like configuration. The filament adhesive preferably has a uniform cross-section, but could also have non-uniform cross-sections. Advantageously, a filament adhesive can be fed continuously from a spool into a dispensing apparatus, such as a dispensing head.

Particularly useful filament adhesives have a core-sheath filament configuration, as described in co-pending U.S. Provisional Patent Application No. 62/633,140 (Nyaribo, et al.). Core-sheath filament materials have a configuration in which a first material (i.e., the core) is surrounded by a second material (i.e., the sheath). Preferably, the core and the sheath are concentric, sharing a common longitudinal axis. The ends of the core need not be surrounded by the sheath.

An exemplary filament adhesive is shown in FIG. 1 and hereinafter referred to by the numeral 100. The core-sheath filament adhesive 100 comprises an adhesive core 102 and a non-tacky sheath 104. The adhesive core 102 is a pressure-sensitive adhesive at ambient temperature. As shown, the core 102 has a cylindrical outer surface 106 and the sheath 104 extends around the outer surface 106 of the core 102. The core-sheath filament adhesive 100 has a cross-section that is generally circular as shown here, but it is to be understood that other cross-sectional shapes (e.g., square, hexagonal, oblong, oval, or multi-lobed shapes) are also possible.

Advantageously, the non-tacky sheath 104 prevents the filament adhesive 100 from sticking to itself, thereby enabling convenient storage and handling of the filament adhesive 100 on a spool. In some embodiments, the sheath comprises a powder or other material that prevents the filament adhesive from sticking to itself while in roll form. The sheath is compounded into the core material during the extrusion process.

The diameter of the core-sheath filament is not particularly restricted. Factors that influence the choice of filament diameter include the size constraints on the adhesive dispenser, desired adhesive throughput, and precision requirements for the adhesive application. The core-sheath filament can comprise an average diameter of 1 millimeter to 20 millimeters, 3 millimeters to 13 millimeters, 6 millimeters to 12 millimeters, or in some embodiments, less than, equal to, or greater than 1 millimeter, 2, 3, 4, 5, 6, 7, 8, 9, 10, 11, 12, 13, 14, 15, 16, 17, 18, 19, or 20 millimeters. The filament adhesive 100 can be a stock item and provided in any length appropriate for the application.

The dispensing methods described herein offer many potential technical advantages, at least some of which are unexpected. These technical advantages include, in some embodiments: retention of adhesive properties after dispensing, low volatile organic compound (VOC) characteristics, avoiding die cutting and/or the use of release liners, design flexibility, achieving intricate non-planar bonding patterns, printing on thin and/or delicate substrates, utilization of less material/reducing system waste, and printing on irregular and/or complex topologies.

Core sheath filament adhesives according to the present disclosure can be made using any known method. In an exemplary embodiment, these filament adhesives are made by extruding molten polymers through a coaxial die. Technical details, options and advantages concerning the aforementioned core sheath filament adhesives are described in U.S. Provisional Patent Application No. 62/633,140 (Nyaribo, et al.). Further embodiments and examples showing the making of a filament adhesive and a dispense system are shown in U.S. Provisional Patent Application No. 62/907,325 (Napierala, et al.).

Figure 2:
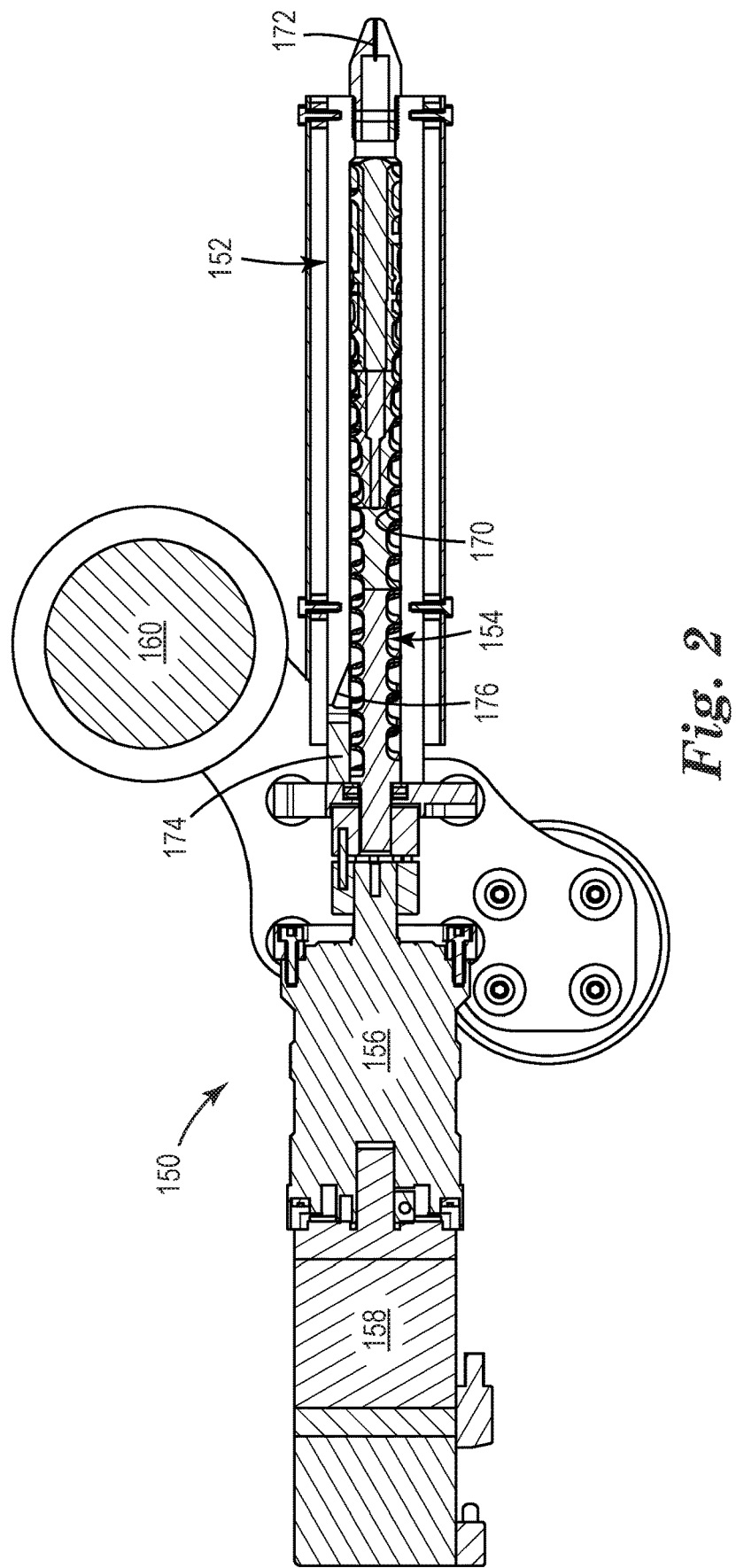
FIG. 2 is a side cross-sectional view of a dispensing head for dispensing the filament adhesive of FIG. 1 according to one exemplary embodiment.

FIG. 2 shows a dispensing head 150 having a configuration for receiving, melting, mixing, and dispensing the filament adhesive 100 of FIG. 1. The dispensing head 150 includes a barrel 152 and a rotatable screw 154 received therein. A gearbox 156 and motor 158 are operatively coupled to the screw 154, and an alignment wheel 160, which may be motorized, is affixed to a side of the barrel 152 through which filament is guided into the dispensing head 150. Further details concerning each of these components are below.

The barrel 152 has the configuration of a barrel used in a single screw extruder. The barrel 152 has an inner surface 170 that is cylindrical and engages the screw 154 in an encircling relation. The inner surface 170 terminates in an outlet 172 at a distal end of the barrel 152. The outlet 172 is generally circular but could also be rectangular or have any other suitable shape. The barrel 152 includes one or more embedded heating elements (not visible) for heating the inner surface 170 and melting the filament adhesive during a dispensing operation. Optionally, the inner surface 170 of the barrel 152 can be grooved or otherwise textured to increase friction between the barrel 152 and the extruded adhesive, and the barrel 152 in some embodiments includes a sleeve insert.

Referring again to FIG. 2, an inlet 174 extends through the top side of the barrel for receiving the filament adhesive. As further shown, the inlet 174 includes a front sidewall 176 defining a beveled nip point where the front sidewall 176 converges with the outer surface of the screw 154. Advantageously, the beveled nip point prevents breakage of the filament adhesive as it is drawn into the barrel 152. The beveled nip point is part of a robust feeding mechanism enabling the filament adhesive to be continuously fed into the barrel 152 without need for operator attendance, and may in some embodiments assist with cleaning, as the extruded filament adhesive can occasionally build up at the inlet.

The drive mechanism for the dispensing head 150 is provided by the gearbox 156 and motor 158. In some embodiments, the dispensing head 150 includes controls allowing for adjustment of the speed and/or torque of the rotatable screw 154. In some embodiments, the motor 158 is a servo motor. Servo motors are advantageous because they can provide a high degree of torque over a wide range of rotational speed.

As shown, the inlet 174 generally has the shape of a reverse funnel, in which the transverse cross-sectional area of the inlet 174 increases with increasing proximity to the screw 154. The inlet 174 has one or more sidewalls, such as front sidewall 176 as shown. The front sidewall 176 can be planar or curved. As viewed from a transverse direction, at least a portion of the front sidewall 176 extends at an acute angle relative to a longitudinal axis of the screw 154. The acute angle, which facilitates feeding of the filament adhesive, can be from 10 degrees to 70 degrees, from 18 degrees to 43 degrees, from 23 degrees to 33 degrees, or in some embodiments, less than, equal to, or greater than 10 degrees, 13, 15, 17, 20, 22, 25, 27, 30, 32, 35, 37, 40, 42, 45, 47, 50, 53, 55, 57, 60, 65, or 70 degrees.

Figure 3:
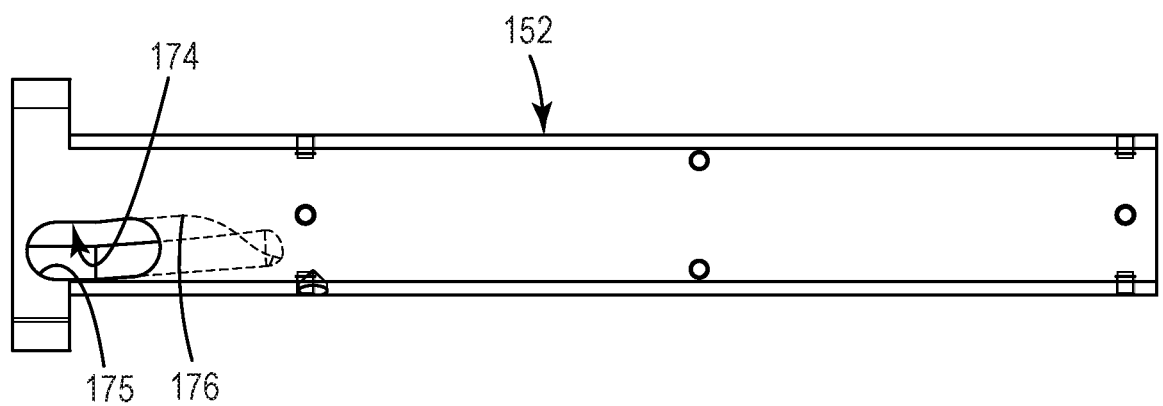
FIG. 3 is a side elevational of a barrel component of the dispensing head of FIG. 2, revealing certain internal surfaces in dotted lines.

FIG. 3 shows a top view of the barrel 152, revealing further detail concerning the shape of the inlet 174. The inlet 174 includes outer entrance 175 and hidden surfaces extending from the outer entrance 175 and shown in dotted lines.

As can be seen from FIG. 3, the front sidewall 176 is not planar, but has a complex compound curvature. Curved surfaces of the inlet 174, which include the front sidewall 176, collectively define a recess in the inner surface 170 of the barrel 152 to accommodate the filament adhesive as it is being fed. Overall, the inlet 174 can extend along from 10 percent to 40 percent, from 15 percent to 35 percent, 20 percent to 30 percent, or in some embodiment, less than, equal to, or greater than 10 percent, 12, 15, 17, 20, 22, 25, 27, 30, 32, 35, 37, or 40 percent of the nominal screw length.

The recess circumscribed by the inlet 174 can extend, as here, along both axial and circumferential directions relative to the screw 154. By providing space for the filament adhesive to move within the barrel 152, the recess reduces the likelihood that the flights of the rotatable screw 154 would sever the filament adhesive during operation of the dispensing head 150. This is inconvenient because filament breakage interrupts the dispensing process and requires that an operator manually re-inserts the filament adhesive into the dispensing head 150 before re-starting the process.

FIGS. 4 and 5 show features of the screw 154 in more detail. The screw 154 includes a shank 180 at one end for coupling to a drive mechanism. The shank 180 is connected to a shaft 182 with a diameter that progressively increases along its length. Extending around the shaft 182 are helical flights 184 for conveying molten material in the forward direction as the screw 154 rotates within the barrel 152.

Proximate to where the filament adhesive is fed into the dispensing head 150, notches 188 are provided in the helical flights 184 to provide gripping lugs 186, as also shown in the cross-sectional view of FIG. 5. The gripping lugs 186 provide additional edges that assist in catching and actively pulling a continuous filament adhesive through the inlet 174 and into the barrel 152. This is a significant benefit over feeding mechanisms that require adhesive to be pushed into the feed zone, which can induce buckling and kinking of the filament adhesive. The gripping lugs 186 can extend across from 1 percent to 30 percent, from 3 percent to 25 percent, from 5 percent to 20 percent, or in some embodiments, less than, equal to, or greater than 1 percent, 2, 3, 4, 5, 6, 7, 8, 9, 10, 11, 12, 13, 14, 15, 16, 17, 18, 19, 20, 22, 25, 27, or 30 percent of the nominal screw length. If gripping lugs are too shallow, they will not effectively pull filament into the inlet. If they are too deep, they will pull in filament at a rate higher than it can be moved lengthwise down the barrel, and thus cause a buildup of adhesive at the inlet, which can interfere with dispensing.

Located on the opposite end of the screw 154 is a mixing section 190. The mixing section 190 includes a plurality of cylindrical posts 192. The mixing section 190 may be represented in other configurations not shown in FIG. 4, however. Other screw features that may be employed include fluted cylinders (as found in Maddock mixers), densely flighted screw sections with crosscuts (as found in Saxton mixers), or any of a variety of known post patterns, including those used for pineapple mixers. Optionally, posts or pins may be disposed on the interior sidewalls of the barrel 152 and aid in the mixing process; if so, crosscuts may be present in the flights of the screw 154 to avoid interference.

The length of the mixing section 190 is not particularly restricted and can depend on various factors including the adhesive composition being extruded and the feed rate of the filament adhesive. The mixing section 190 can be from 5 percent to 30 percent, from 7 percent to 25 percent, from 8 percent to 20 percent, or in some embodiments, less than, equal to, or greater than 5 percent, 6, 7, 8, 9, 10, 11, 12, 13, 14, 15, 16, 17, 18, 19, 20, 22, 25, 27, 30, or 35 percent of the nominal screw length.

For effective melting, mixing, and dispensing of a filament adhesive within a relatively compact enclosure, the ratio of nominal screw length and screw diameter can be from 8:1 to 20:1, from 9:1 to 17:1, from 10:1 to 14:1, or in some embodiments, less than, equal to, or greater than 8:1, 9:1, 10:1, 11:1, 12:1, 13:1, 14:1, 15:1, 16:1, 17:1, 18:1, 19:1, or 20:1.

The provided dispensing head 150 can display significant throughputs. In preferred embodiments, the dispensing head is capable of dispensing the adhesive composition at a throughput of at least 3 kg/hr, at least 4 kg/hr, at least 5 kg/hr, at least 6 kg/hr, at least 7 kg/hr, at least 8 kg/hr, or at lest 20 kg/hr.

Figure 6:
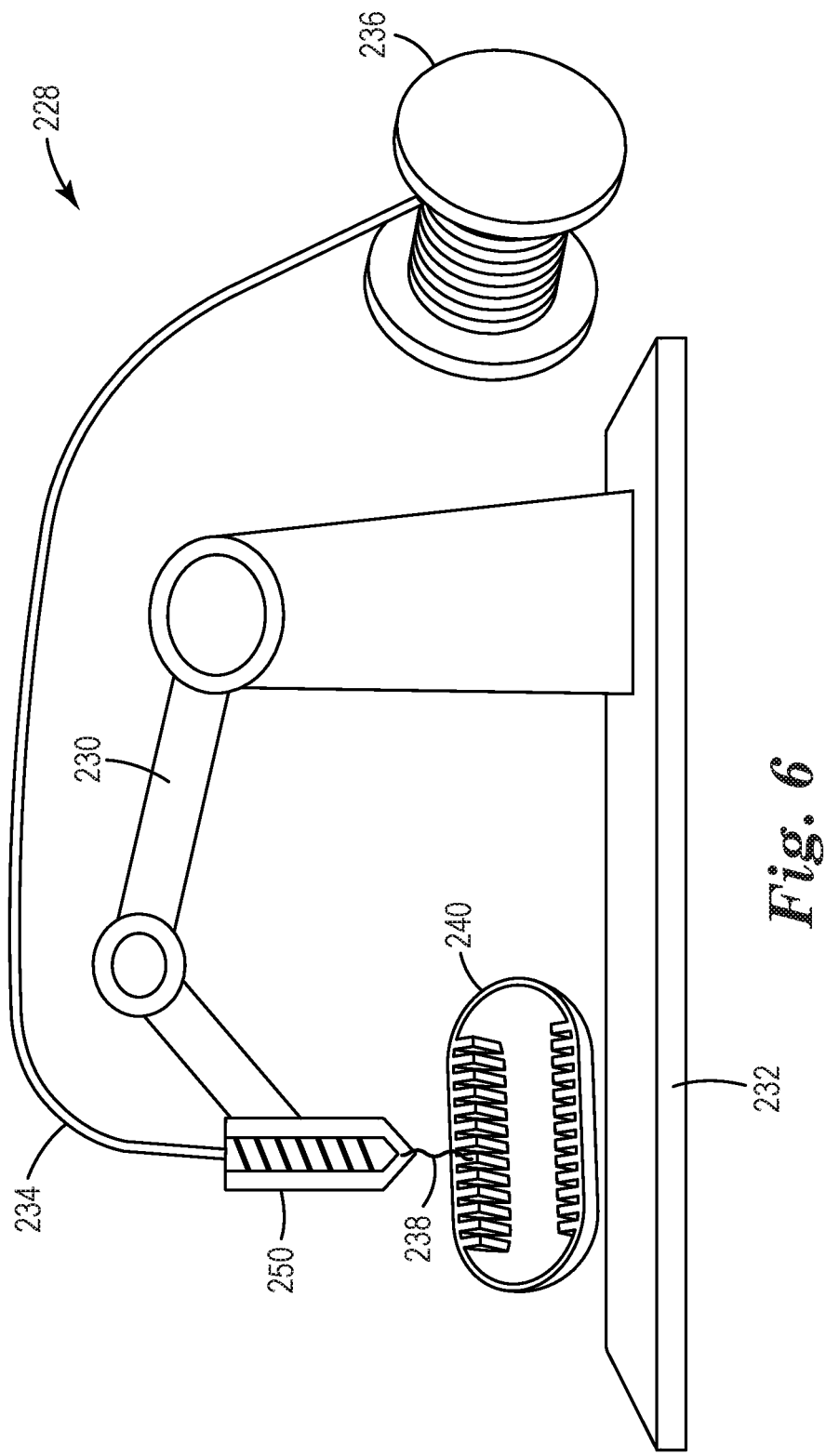
FIG. 6 is perspective view of a system that incorporates the filament adhesive of FIG. 1 and dispensing head of FIGS. 2-3, respectively.

FIG. 6 presents a schematic illustration of a dispensing system 228 that includes a dispensing head 250 outfitted with a mount for attachment to the end of a movable arm 230. The dispensing head 250 can have features analogous to that of the dispensing head 150 as previously described. The movable arm 230 is affixed to a table 232 and can have any number of joints to allow the dispensing head 250 to be translated and rotated in up to six degrees of freedom. The movable arm 230 allows the dispensing head 250 to dispense an adhesive composition with precision and reproducibility, and over a wide range of locations relative to the table 232.

Optionally and as shown, the dispensing system 228 additionally includes a filament adhesive 234 for continuously feeding into the dispensing head 250 as shown in FIG. 6. The filament adhesive 234 can be continuously unwound from a spool 236 as shown. It is to be understood that the location of the spool 236 relative to other components of the dispensing system 228 is not critical and can mounted where convenient. The spool 236 can be fixtured to the table 232 or a structure thereon.

The dispensing head 250 of FIG. 6 is being shown dispensing an adhesive composition 238 in hot melt form onto the bonding surface of a substrate 240. The substrate 240 need not be limited and can be, for example, an industrial part to be adhesively coupled to an assembly. As an option, the substrate 240 can be mounted onto the table 232, thereby providing a spatial point of reference for positioning of the dispensing head 250. This can be especially useful in an automatic process, where a computer having a processor and memory is used to control the position and orientation of the dispensing head 250.

The dispensing of the adhesive composition 238 can be automated or semi-automated, thus requiring little or no intervention by a human operator. One advantage of the provided methods is the possibility of dispensing the adhesive composition 238 onto the substrate 240 according to instructions provided by a computer processor and based on a pre-determined pattern. The pre-determined pattern can be 2-dimensional (along a planar surface) or 3-dimensional (along a non-planar surface). The pre-determined pattern can be represented by digitized model on the computer processor, enabling the pre-determined pattern to be customized for any of a variety of different substrates. As used herein, a computer is a device having processor and memory, and may be communicatively coupled to other devices, such as a scanning apparatus to interrogate topography of a target substrate, or a to control mechanisms associated with a dispensing system, as well as other input means for human control of the computer system (as needed—for example, user interfaces, keyboards, etc.).

Here, the adhesive composition 238 is a thermoplastic elastomer, allowing it to continue to flow after it is dispensed. In certain applications, the molten adhesive conforms to the shape of protruding or recessed features of the substrate 240 for increased mechanical retention. Optionally, the protruding or recessed features can have one or more undercuts to further improve the strength of the bond.

In FIG. 6, the bonding surface of the substrate 240 has a ribbed configuration, enabling the adhesive composition 238 to flow and penetrate the recessed areas between the ribs. By providing an increased surface area for bonding, this configuration provides a significantly stronger bond compared with a planar bond configuration. Upon cooling the adhesive composition 238 to ambient temperature, its cohesive strength increases, and the material behaves as a pressure-sensitive adhesive.

In some embodiments, the adhesive-backed substrate 240 can be immediately placed in contact with a corresponding article or assembly to close the bond. Such an operation may be manual, semi-automated, or fully automated. If the adhesive-backed substrate 240 is not ready to be bonded, exposed surfaces of the dispensed adhesive can be covered by a release liner to preserve its tackiness. Depending on the application, the adhesive-backed substrate can then be packaged, stored, or transported to a subsequent manufacturing process.

Further refinements are also possible. While not explicitly shown in the drawings, one or more additional heating elements may be provided to pre-heat the filament adhesive before it enters the heated barrel of the dispensing head. Pre-heating the filament adhesive can allow the screw/barrel to be shortened, since less heat is needed to melt a pre-heated adhesive. The additional heating elements can be located on a peripheral component or part of the dispensing head itself. In some embodiments, the alignment wheel 160 incorporates the additional heating elements.

The dispensed adhesive can also be applied to another adhesive article. For example, it can be used to make a skin adhesive on a foam tape. The dispensed material may be foamed or non-foamed. Non-foamed adhesive compositions are sometimes preferred because they are more easily reworked without loss in performance. Foamed adhesives, on the other hand, can be cost-effective and useful for bonding to rough, or otherwise uneven, surfaces. Optionally, the filament adhesive is foamed by incorporating glass bubbles or other foaming ingredients into the filament adhesive composition.

Useful features and applications for the provided dispensing head can extend beyond those in this disclosure, and some are described in co-pending U.S. Provisional Patent Application No. 62/810,221 (Napierala et al.) and 62/810,248 (Napierala et al.), both filed on Feb. 25, 2019.

There are many advantages to dispensing a pressure-sensitive adhesive using the provided dispensing head. Its deployment in a dispensing system uses a spooled filament adhesive as a roll good, making loading and replacement of consumable materials easier, particularly in an automated process. The provided screw configurations are also well suited for use PSA filament adhesives, which have a relatively soft viscoelastic consistency and are difficult to feed into conventional dispensers. Unlike conventional dispensers, the provided dispensing head does not need heated hoses, and has easier changeover compared to typical hot melt or curable liquid adhesive dispensing systems. Additionally, confining heating elements to a small space (the dispense head) greatly simplifies many aspects of the adhesive application system, as compared with hot melt technology. For example, with hot melt technology, a large volume of material must be heated and then pumped, and the hoses must be purged at the end of a run. This purging and cleanup can take several hours. In contrast, a filament style adhesive with dispense system as described herein confines heating elements to a relatively very small area (the dispense head), and at the end of a job the system can be, in some embodiments, simply turned off, and the application resumed later.

The provided dispensing head is also modular, enabling it to be used with any of various customized nozzles, providing a desired degree of precision in adhesive placement. The provided dispensing head can allow adhesive to be dispensed in a customized fashion. For example, it is possible to dispense an adhesive onto a substrate in a dot, stripe, or other discontinuous, pattern. Suitable coating patterns, as mentioned previously, need not be planar and can located on complex and irregular bonding surfaces.

The provided dispensing head is highly efficient and lightweight. In some embodiments, the dispensing head has an overall weight that is at most 10 kg, at most 8 kg, or at most 6 kg. Working examples of the dispensing head are light and compact enough to be mounted to light duty robotic arms currently used in manufacturing facilities. Since the screw and barrel are configured to provide excellent mixing within a short residence time in the melt zone, there is also reduced waste and minimal risk of thermal degradation of the adhesive. In another embodiment, not shown in FIG. 6, a stationary dispense head applies a molten bead of adhesive to a target substrate which is mounted on a movable base.

Figure 7:
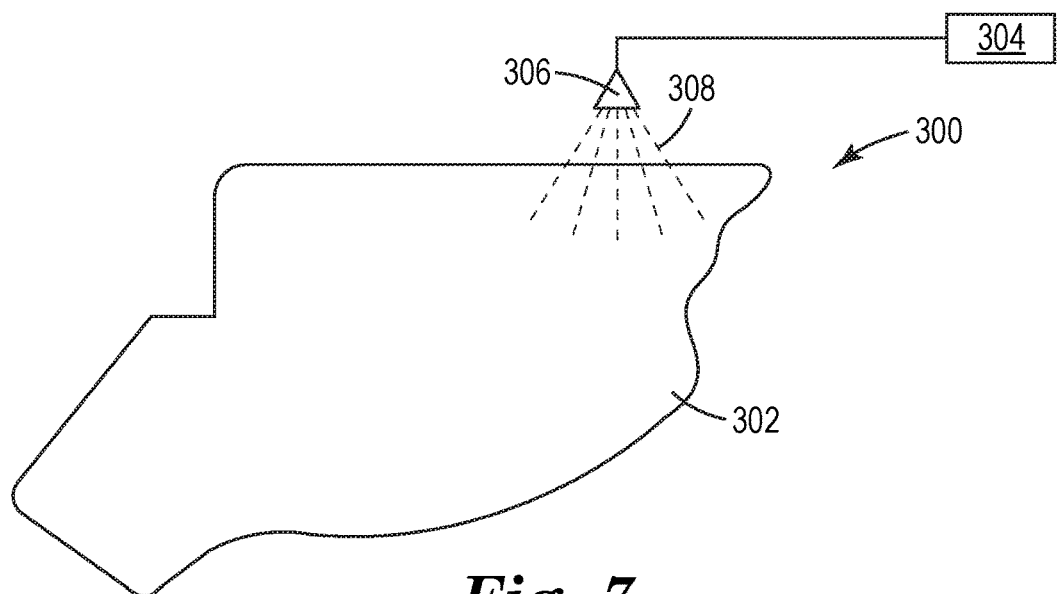
FIG. 7 is a drawing of a target substrate.

Turning now to a discussion of the manner in which a filament adhesive may be applied to a target substrate with the aid of sensors, in order to assure quality application, FIG. 7 shows scanning setup 300. Particularly, target workpiece 302 is shown being scanned by scanner 306, using radiation 308. Scanner 306 is communicatively coupled to control system 304. Scanner 306 may be any suitable scanner that is able to acquire signals mapping the topography of a target surface in greater than two dimensions (for example, either 2D, 2.5D, or 3D. 2D systems rely on contrast-based technology, so 3D technology is preferred for this application. Exemplary scanners include: cameras, vision systems, laser range finders, photogrammetry systems, laser scanners, and structured light imaging systems. In one embodiment, a high-resolution focused optical beam, profilometer, or laser scanning microscopy could be used to measure a 2D profile of the target workpiece 302. The VR Series (Keyence Corporation of Osaka, Japan) or SURFTEST SJ Series (Mitutoyo Corporation of Sakado, Japan) can be used as exemplary scanners. Area averages of the target workpiece 302 surface can also be captured by using optical scattering or low-energy diffraction techniques. Scanning tunneling microscopes or high-resolution imaging cameras can be used to obtain a 3D map of the target workpiece 302. Though radiation-based systems are shown in the figure, mechanical systems that interrogate a target substrate's topography using probes could also be used. Target workpiece could be any workpiece having a bonding application associated with it. This includes as non-limiting examples: industrial manufactured goods, consumer electronics, vehicles, home appliances, etc. Control system 304 may be a general or special purpose computer or control circuitry. Control system 304 receives signals from scanner 306 and creates a digital first topography of target substrate 302. This topography includes information defining the three-dimensional surface of substrate 302. Resultant topographical profiles, in one embodiment, indicate the type of target substrate 302 and define average values for height of peaks or distances between peaks on the surface of the target substrate. It may include one "side" of substrate 302, or many sides if substrate 302 is a multi-dimensional, complicated shape. Scanner 306 may be stationary as the substrate 302 is moved relative to it during scanning, or scanner 306 may be moved relative to substrate 302 during scanning. A model work piece may be scanned by scanner 306 with the resulting digital topography information stored in a computer memory or database, to be retrieved and utilized in association with subsequent work pieces of the same design. Alternatively, each work piece may be individually scanned by scanner 306 as a preliminary matter. This individualized target substrate scanning may be beneficial in certain scenarios, for example, where surface contaminates or other anomalies may be present and interfere with adhesive application. For example, scanner 306 may identify surface energy contaminates, such as oil, moisture, foreign objects, etc., or other defects that could negatively affect adhesive bead application.

Upon acquiring or generating the first topography of the target substrate, a bead application plan is determined or retrieved for the first topography. The bead application plan defines how the dispense head 250 coupled to movable arm 230 may output filament a filament adhesive bead on the target substrate. It includes, for example, information defining a location and which area and type of bead (if there are more than one type—for example, a ribbon profile or a circular profile, or a different type of adhesive), should be applied. It may also define the order of bead application to the target substrate. The bead application plan may be automatically computed using rules in a computer program on a computer, then in some embodiments validated by a human operator, or it may be defined largely by a human worker using a computer system. Additionally, a human operator may modify or extend the computer-suggested application plan. In one embodiment, the surface topography of the part to be mated to the target substrate is also available digitally, and this information is available to the computer system in order to design the bead application plan. Having available the surface topography of the part to be mated to the target substrate allows better design of the adhesive bond line—e.g., in some areas the applied bead needs to be thin and wide; in others it needs to be narrow and thick, etc. The resultant bead application plan may be stored in, for example, an XML file or any other suitable format. The resultant bead application plan may be stored locally, in a storage cloud, or in any other suitable place or medium. The scanning of the target topography may yield part anomalies that could be addressed by the bead application plan, such as warpage, or could yield information indicating the target substrate is not suitable for further processing (for example, it is broken or has other defects). Additionally, the scanning could reveal irregularities in surface energy associated with the target substrate, such as for example the presence of foreign contaminates such as oil, water, or residue. Depending on the specifics of the application, the presence of a surface energy irregularity may or may not mean the part is suitable for further processing.

Along with the application plan, performance criteria associated with the target substrate are also defined. Once again, this could be defined by a computer applying a set of rules to the substrate topography, then validated by a human operator as needed, or it could be designed by a human operator using a computer. Performance criteria are rules that define characteristics of an acceptable bead application on the target substrate. For example, they might define a pattern for which the adhesive would be applied, minimum bead width, thickness, or volume, acceptable percentage coverage in application areas, areas that cannot contain any adhesive, or any other criteria that defines an acceptable bead application on the target substrate that is subject to sensor validation. Typical error conditions, both general and specific to a workpiece, may also be defined. For example, start/stop events during the application of a bead may manifest themselves in certain visual anomalies associated with bead geometry, similar to if one started and stopped the application of a bead of caulk. Start/stop events may be defined as unproblematic in certain areas of a target workpiece, but unacceptable in other areas. Depending on the nature of the start/stop event, if a bead is determined to be deficient in a particular area of the target workpiece, a potential cure condition (bead augmentation, for example) could also be defined. Another error condition that may be defined is sputtering, where a bead of filament adhesive is for various reasons not extruded properly. Sputtering is typically defined by air becoming entrapped in the dispense head, the adhesive producing a large amount of shear while moving through the dispense head, or the system generating or becoming exposed to more heat than it can effectively manage. This condition could exist if a filament adhesive runs out or ceases to unwind or be based on other error conditions with the dispense head (clog, motor failure, etc.). Similar to a start/stop event, sputtering may or may not be problematic in certain areas of a target workpiece, and the acceptability of sputtering may be a function of the volume sputtered, for example. This is, in some embodiments, defined in the performance criteria. Minimal volumetric outputs of adhesive in given areas may also be aspects of the performance criteria. Additionally, suitable corrective actions may also be defined—for example, if bead augmentation is suitable in one area, but in another area the piece needs to be completely redone or needs the attention of a human operator this, could also be defined in the performance criteria. The concept of a corrective action being conditioned on another condition is termed a conditional corrective action; in such a case, both the corrective action (for example, bead augmentation—e.g., further applying another bead in the area where the error condition exists) and the conditional aspect (for example, in this area of the target substrate) would both be defined as part of performance criteria.

Both the bead application plan and the performance criteria may be defined in any suitable computer readable medium. For example, a text file or an XML file, or using any other suitable markup language. A database management systems (DBMS) executing on one or more database servers may also be used. The database management systems may be a relational (RDBMS), hierarchical (HDBMS), multidimensional (MDBMS), object oriented (ODBMS or OODBMS) or object relational (ORDBMS) database management system. Data describing the bead application plan could be stored within a single relational database such as SQL Server from Microsoft Corporation. The bead application plan may define movements of a control arm and dispense head, in one embodiment, but more preferably includes a topographical map of target substrate as acquired in conjunction with description associated with FIG. 7, and defines instead an order of application for the various bead dispensing, and then a control system associated with the actual dispensing of the adhesive bead would receive the bead application plan and translate it into particular commands needed to cause the dispense head to dispense the adhesive bead according to the plan.

Turning now to FIG. 8, target substrate 302 is again shown, but now includes a first bead of ribbon profile adhesive 310, and round profile bead adhesive 238, which is in the process of being applied by dispense head 250 and the dispensing system describe earlier with respect to FIG. 6 (like numbers referring to like elements except as noted). Control system 276, a computer having a process and memory, is shown communicatively coupled to applicator. While two separate beads, each having a different profile, are shown in FIG. 8, any number of other bead profiles could be used, and in any pattern that is practical. The beads shown in FIG. 8 were deposited in accordance with a bead application plan, as described above. Bead profiles, more fully described later with respect to FIG. 10, may be altered by changing the extruding orifice 285 of dispense head 250. This may be done manually, for example control system 276 may interpret the bead application plan to require a different extruding orifice and may sound an audible or visual alert for a worker to change the extruding orifice, or preferably this is done automatically by control system 276 entering an extruding orifice change routine, which causes dispense head to move to orifice storage array 280 and exchange one extrusion orifice of a first profile for a second extrusion orifice of a second profile. FIG. 8 shows two extrusion orifices with different profiles: extrusion orifice 281 may be a ribbon style orifice, suitable for depositing a ribbon profile such as deposited bead 310, or extrusion orifice 283 may be a small round bead profile.

Figure 9:
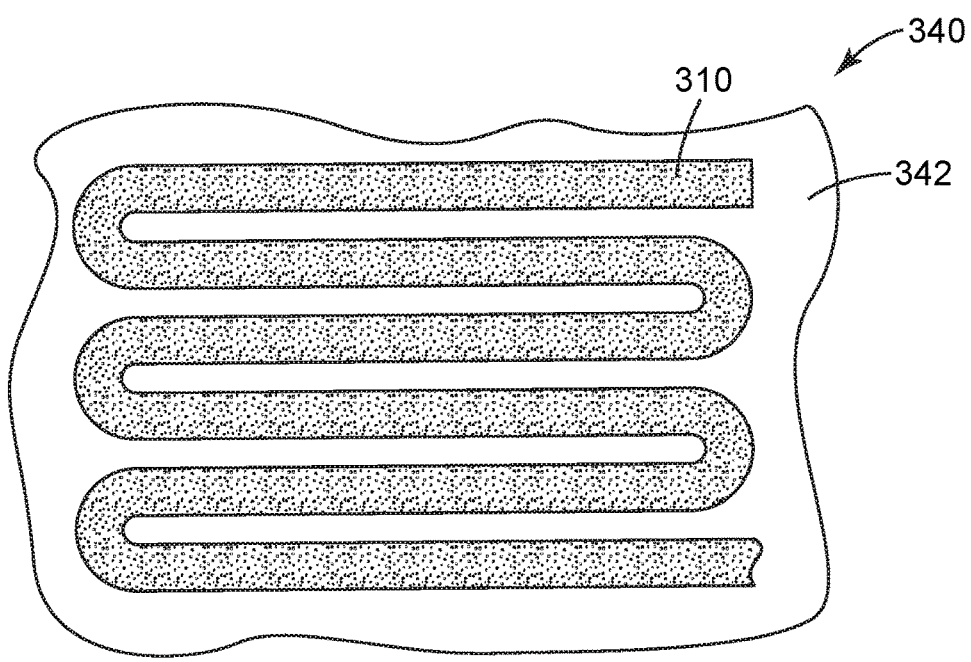
FIG. 9 is a plan view perspective of a bead of adhesive with a ribbon profile.

FIG. 9 shows bead 310 with a ribbon profile applied to target substrate 342 in application scenario 340. This sort of a profile may be appropriate for subsequently applying a placard or further large surface area substrate.

Figure 10:
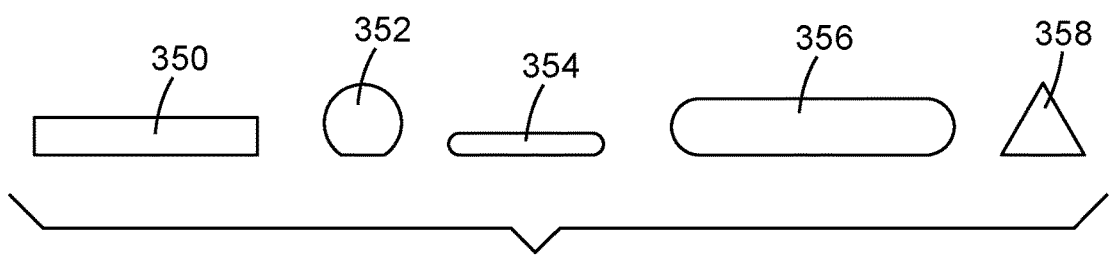
FIG. 10 shows different bead profiles.

FIG. 10 shows non-limiting examples of bead profiles that could be formed with various extrusion orifices. Rectangle bead 350; round bead 352; ribbon bead 354, oval bead 356, and triangular bead 358 are all shown. Other extrusion profiles are possible as needed.

Figure 11:
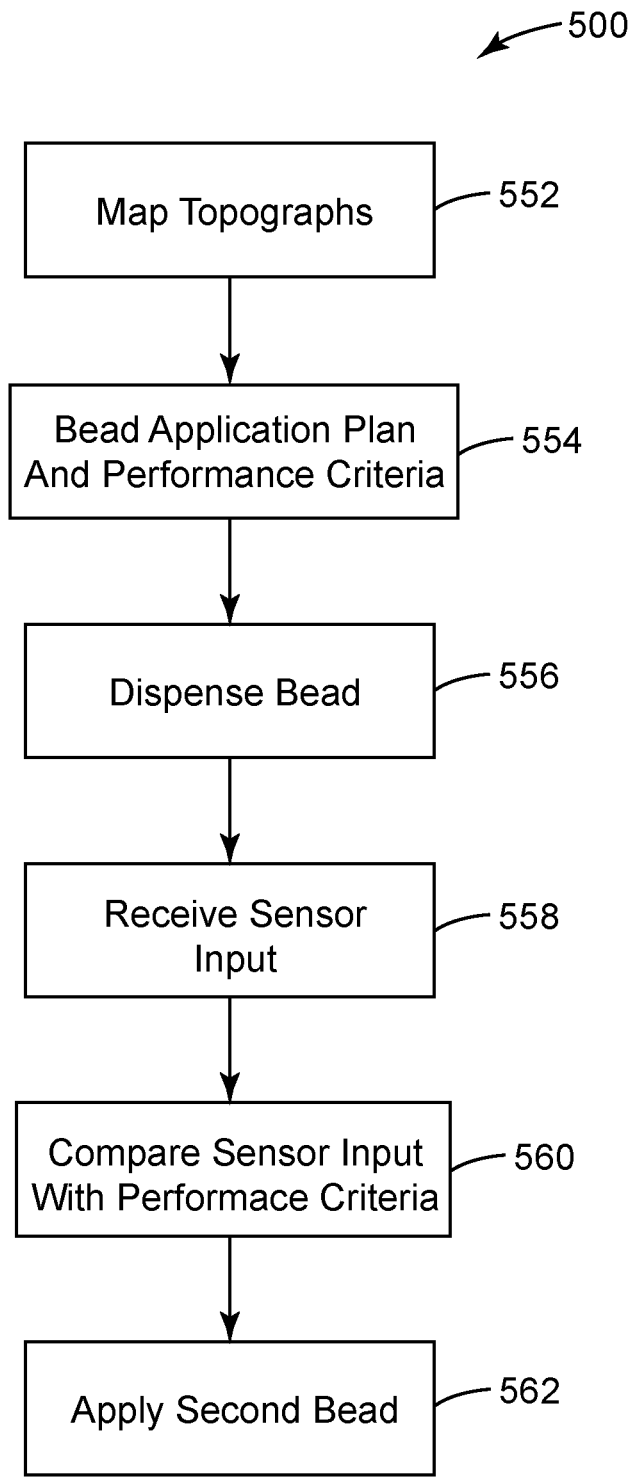
FIG. 11 is an exemplary method of applying a bead of filament adhesive.

FIG. 11 shows a method 500 of applying a bead of filament adhesive to a target substrate. First, (step 552) a topological map of the target substrate is created. This was further described above with respect to FIG. 7. If the target substrate topography is already known, this step may be omitted, and the substrate topography utilized directly. Next, in step 554, a bead application plan and performance criteria are either loaded or received, as described with respect to FIG. 8. Next, the bead of filament adhesive is applied with a computer controlled dispense head (step 556) according to the bead application plan. A sensor, which may be the same sensor used to create the topographical map of the target substrate as described with respect to FIG. 7, or may be a different sensor, as described above, next receives sensor (step 558) input associated with the dispensed bead. This sensor may sense any useful characteristics of the target substrate combined with the applied bead. For example, it may scan locations where the applied bead exists on the substrate; it may also scan and determine the bead profiled; or percentage of coverage. It may scan for bead profile or volume of bead in an area of the target substrate. Next, in step 560, the sensor input is compared against performance criteria for the target substrate. Performance criteria is described above with respect to FIG. 8. For example, a performance criterion for a particular substrate may specify that a particular area on the target substrate needs to have a particular volume of adhesive on it, or a particular % coverage. The performance criteria may also define valid corrective actions for types of error conditions. For example, in a particular area of the target substrate, it the scan reveals that there is not enough adhesive applied, the corrective action could be a simple as logic indicating that bead augmentation (e.g., re-applying) is a valid corrective action. In other areas, bead application may not be valid because, for example, bead application may result in an excessive amount of adhesive material in certain areas, which may or may be acceptable based on application.

The result of a comparison of the sensor input with the performance criteria is a second bead application plan, which is consistent with any valid corrective actions indicated in the performance criteria. For example, the second application plan would include information defining a subsequent bead application plan. This may include bead augmentation in certain areas, using application heads with different extrusion profiles as needed. A bead profile review after application might also provide other information, for example how well the extruded bead was put on the substrate. For example, certain bead profiles may be indicative of the extent to which the adhesive is wetting out upon the surface.

Finally, a second bead of filament adhesive is applied to the target substrate consistent with the second bead application plan. In some embodiments, this is done immediately following application and inspection of the bead of the first application plan, before the adhesive previously applied to the target substrate cools down too much.

This basic process as outlined in FIG. 11 may be repeated once further, or several times further, depending on the complexity of the target substrate, the complexity of the application plan, and the tendency for errors. Each iteration results in a further bead application plan, which theoretically would get reduced each iteration until all performance criteria are met.

Material Preparation & Evaluation

This section demonstrates the making and deposition of a filament adhesive using a dispense head as described above, and as would be augmented and extended by the above described method.

TABLE 1

Materials:

| Designation | Description | Source |
| --- | --- | --- |
| AA | Acrylic acid | BASF Corporation, Florham Park, NJ. United States |
| EHA | 2-ethyl hexyl acrylate | BASF Corporation, Florham Park, NJ. United States |
| IOTG | Isooctylthioglycolate | Showa Denko Corporation Tokyo, Japan |
| Irg651 | 2-dimethoxy-2-phenyl-acetophenone, a photo-initiator available under the trade designation IRGACURE 651 | BASF Corporation, Florham Park, NJ. United States |
| Nucrel | Ethylene-acrylic acid copolymer resin 9 wt % Acrylic Acid with a melt flow index of 10 gram/10 min, available under the trade designation NUCREL 3990 | Dupont Chemical, Wilmington, Delaware, United States |

Test Methods

90° Peel Strength Test: A 12.5-millimeter wide by 1.5-millimeter thick by 125-millimeter long strip of sample adhesive was dispensed directly onto a substrate. The sample adhesive was allowed to cool to room temperature (25° C.) for ten minutes. Next, aluminum foil was manually laminated to the exposed sample adhesive surface using two passes of a 6.8-kilogram steel roller in each direction. The bonded samples were allowed to dwell for four hours at 25° C. and 50% humidity. The peel test was carried out using a tensile tester equipped with a 50-kilonewton load cell at room temperature with a separation rate of 30.5 centimeters/minute. The average peel force was recorded and used to calculate the average peel adhesion strength in newtons/centimeter.

Static Shear Strength Test: A 12.5-millimeter wide by 1.5-millimeter thick by 25.4-millimeter long strip of sample adhesive was dispensed directly onto an aluminum coupon with the length of the strip spanning the width of an aluminum coupon. The aluminum coupon was created by cutting an aluminum plaque material (anodized aluminum 5005-H34 Code 990MX, 1.6-mm thick, 101.6-mm wide, 304.8-mm long obtained from Lawrence & Frederick Inc, Streamwood, Illinois, United States) into 25.4-millimeter wide by 50-millimeter long pieces with a six-millimeter hole centered on the narrow edge for hanging a bonded sample onto a test hook. After cooling to room temperature for ten minutes, a 25.4-millimeter wide by 120-millimeter long aluminum foil strip was attached to the exposed sample adhesive surface using two manual passes of a 6.8-kilogram steel roller in each direction. The tail of the foil was looped over and stapled. The bonded samples were subjected to a dwell time of four hours at 25° C. and 50% humidity. The test panel was mounted vertically onto a hook at room temperature, and a 250-gram weight was attached to the loop in the aluminum foil. The hanging time at which the sample fell from the plastic substrate was recorded. The test was stopped after 72 hours if failure had not occurred.

Self-Adhesion Test: It is desirable for the core-sheath filaments to not fuse or block together during storage. The sheath material provides the non-adhering surface to cover the core adhesive. The Self-Adhesion Test was conducted on films of the pure sheath material to determine whether or not candidate sheath materials would meet the requirement of being "non-tacky". Coupons (25 millimeters×75 millimeters×0.8 millimeters) were cut out. For each material, two coupons were stacked on each other and placed on a flat surface within an oven. A 750-gram weight (43-millimeter diameter, flat bottom) was placed on top of the two coupons, with the weight centered over the films. The oven was heated to 50 degrees Celsius, and the samples were left at that condition for 4 hours, and then cooled to room temperature. A static T-peel test was used to evaluate pass/fail. The end of one coupon was fixed to an immobile frame, and a 250-g weight was attached to the corresponding end of the other coupon. If the films were flexible and began to peel apart, they formed a T-shape. If the two coupons could be separated with the static 250-gram load within 3 minutes of applying the weight to the second coupon, it was considered a pass and was non-tacky. Otherwise, if the two coupons remained adhered, it was considered a fail.

Step 1: Acrylic Resin Preparation

Two sheets of ethylene/vinyl acetate film having a vinyl acetate content of 6% and a thickness of 0.0635 millimeters (0.0025 inches) (obtained from Consolidated Thermoplastics Co. of Schaumburg, IL United States) were heat sealed on their lateral edges and the bottom using a liquid form, fill, and seal machine to form a rectangular tube measuring 5 cm (1.97 inches) wide. The tube was then filled with a monomer mixture of 89.8% EHA, 10% AA, 0.05% IOTG, and 0.15% Irg651. The filled tube was then heat sealed at the top and at periodic intervals along the length of the tube in the cross direction to form individual pouches measuring 18 cm by 5 cm, each containing 26 grams of composition. The pouches were placed in a water bath that was maintained between about 21° C. and 32° C., and exposed first on one side then on the opposite side to ultraviolet radiation at an intensity of about 4.5 milliwatts/square centimeter for 8.3 minutes to cure the composition. The radiation was supplied from lamps having about 90% of the emissions between 300 and 400 nanometers (nm).

Step 2: Creation of Sample Adhesive Composition

The Acrylic Resin (created in Step 1) and Nucrel were coaxially coextruded to form a core-sheath filament. Nucrel was the outer sheath material and was 6.5% of the overall adhesive composition by mass. The filament diameter was 8 millimeters. The Acrylic Resin was fed into the coaxial die at 163 degrees Celsius, through a 40-millimeter twin screw rotating at 200 RPM. The Nucrel was fed into the die at 193 degrees Celsius from a 19-millimeter twin screw rotating at 9 RPM. The filament adhesive was wound onto rolls and stored for dispensing. Nucrel was subjected to Self-Adhesion testing and passed.

Step 3: Dispense Sample Adhesive

The dispensing temperature was 180 degrees Celsius. The screw speed for test samples was 300 RPM for making test specimens, and varied for throughput measurements, as represented in Table 3.

TABLE 2

Throughput Measurements at Various Screw RPM

| Screw RPM | Flow Rate (kg/h) |
|---|---|
| 30 | 1.3 |
| 100 | 4.3 |
| 200 | 7.2 |
| 250 | 8.6 |

Throughput of the dispenser was measured by collecting material for 60 seconds, and weighing the dispensed material.

In addition to throughput measurements, adhesive bond performance was evaluated using adhesive from Step 2. Substrates were coated by manually moving them under the dispense head at 25 millimeters per second. The gap between the substrate and the nozzle was one millimeter during dispensing. Aluminum (anodized aluminum 5005-H34 Code 990MX, 1.6-mm thick, 101.6-mm wide, 304.8-mm long obtained from Lawrence & Frederick Inc, Streamwood, Illinois, United States) and wood (S4S Poplar 12.7-thick, 76.2-mm wide, 300-mm long) substrates were peel strength tested as received without any additional cleaning or priming steps. Bonded test specimens were then evaluated for 90° Peel Strength and Static Shear Strength. The results are represented in Table 3.

Comparative

An acrylic foam tape with a comparable composition was selected for comparison to the adhesive from Step 2. Aluminum and wood were selected as substrates to represent substrates that are both recommended and not recommended for acrylic foam tape. The porous irregular wood substrate is generally not recommended for acrylic foam tape bonding because of limited bond performance. Acrylic foam tape, 5665 obtained from 3M Company of St. Paul, MN, United States, was cut to the sizes described below and underwent 90° Peel Strength and Static Shear Strength testing as mentioned above. With slight modification to the test methods respecting preparation of the samples defined as follows: A 12.5-millimeters wide by 125-millimeters long strip was adhered to an aluminum foil strip, with the non-liner side attaching to the aluminum strip. The release liner was removed and the liner side was attached to the substrate of interest using two manual passes of a 6.8-kilogram steel roller in each direction. Aluminum (anodized aluminum 5005-H34 Code 990MX, 1.6 mm thick, 101.6 mm wide, 304.8 mm long obtained from Lawrence & Frederick Inc, Streamwood, Illinois, United States) and wood (S4S Poplar 12.7 thick, 76.2 mm wide, 300 mm long) substrates were peel strength tested as received without any additional cleaning or priming steps. The results are represented in Table 3.

TABLE 3

Peel Adhesion and Shear Strength

| | Peel Strength to Aluminum N/cm | Peel Strength to Wood N/cm | Shear Strength 250 g |
|---|---|---|---|
| Adhesive from Step 2 | 27.8 | 13.7 | PASS, >72 hours |
| Comparative | 34.5 | 5.3 | PASS, >72 hours |

Screw Fabrication:
A 25.4 cm (10.0 inch) head screw 154 with a diameter of 1.91 cm (0.75 inches) as represented in FIG. 4 was machined in a computer numerical controlled (CNC) three-axis vertical endmill. The machining process was performed on a solid block of aluminum using two operations. In the first step, the top half of the screw, as viewed down the screw axis, was machined. The partially milled block was flipped over, and the other half of the screw was then machined.

Barrel Fabrication:
A 22.9 cm (9.0 inch) by 5.08 cm (2.0 inch) by 5.08 cm (2.0 inch) barrel 152 as represented in FIG. 2 was machined in a CNC three-axis vertical endmill. The machining process was performed on a solid block of aluminum. The center cavity was first drilled with a drill bit, and then reamed to 1.92 cm (0.7574 inches). A beveled inlet 174 was initially milled perpendicular to the barrel axis, and then a second milling operation was performed at an angle of 28 degrees offset from the parallel of the barrel axis.

Robot Mounting Bracket Fabrication:
A robot mounting bracket with a thickness of 1.27 cm (0.5 inch) was machined out of aluminum. The robot mounting bracket featured tapped holes for mounting the alignment wheel motor. Two sets of through holes were placed to connect to the gearbox 156 mounting bracket and barrel mounting bracket. In addition, holes and a circular indention were provided for mounting to a UR-10 robot arm from Braas Corp. of Eden Prairie, MN, United States.

Gearbox Mounting Bracket Fabrication:
A gearbox 156 mounting bracket with a thickness of 1.27 cm (0.5 inch) was machined out of aluminum. The gearbox 156 mounting bracket featured holes for connecting to the face of a gearbox.

Barrel Mounting Bracket Fabrication:
A barrel 152 mounting bracket with a thickness of 1.27 cm (0.50 inch) was machined out of aluminum. The barrel 152 mounting bracket featured holes for connecting to the face of the gearbox 156.

Dispensing Nozzle Fabrication:
A dispensing nozzle 172 was machined with a threaded end. The threaded end had a 0.64-cm (0.25-inch) hole that connected to a 0.1-cm (3.94E-2 inch) by 1.27-cm (0.5-inch) slot opening.

Alignment Wheel Fabrication:
A 2.54-cm (1.00-inch) thick alignment wheel 160 with a connected shaft was machined out of aluminum. The radius of curvature of the outside of the alignment wheel was 0.5 cm (0.196 inches).

Alignment Wheel Heating Block Fabrication:
A 1.20-cm thick alignment wheel 160 heating block was machined out of aluminum. The block had two slots for mounting insertion heating cartridges obtained from McMaster-Carr of Elmhurst, IL United States.

Thermal Shield Fabrication:
Four 0.16-cm thick thermal shields (left, right, top and bottom) were machined from glass-mica ceramic plates obtained from McMaster-Carr of Elmhurst, IL United States.

Dispense Head Assembly:
An SVL-204 servo motor 158 obtained from Automation Direct of Cumming, GA United States was connected to a 10:1 gear box. The screw 154 was inserted into the barrel 152, and a thrust bearing, with washer on each side was put onto the screw shaft. Then, the barrel and screw assembly were inserted through the barrel 152 mounting bracket, with the thrust bearing and washers seating in the barrel mounting bracket. The gearbox 156 was mounted onto the gearbox bracket. The shaft of the gearbox 156 and the screw 154 were connected with a motor shaft coupler. Both the barrel 152 bracket and the gearbox 156 bracket were connected to the motor mounting bracket. The dispense head was mounted onto the robotic arm. The nozzle was screwed into the barrel. All electrical connections were made. The barrel was heated with three 100-Watt heating cartridges embedded within the barrel. The temperature was monitored with a type J thermocouple. The barrel was insulated with ceramic plates fastened to the exterior of the barrel.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of automatically applying a bead of filament adhesive to a target substrate having a substrate topography, comprising:
  receiving, in a processor, digital input defining a bead application plan and performance criteria associated with the substrate topography;
  providing signals, from the processor, causing a dispensing system with a dispense head to dispense a first set of beads of molten core-sheath filament adhesive according to the bead application plan;
  receiving, in the processor, first sensor input associated with dispensed first set of beads of extruded core-sheath filament adhesive;

analyzing, in the processor, first sensor input in association with the application plan and performance criteria to compute deficiencies associated with the dispensed first set of beads of extruded core-sheath filament adhesive, and creating a second bead application plan to remedy the computed deficiencies; and, providing signals, from the processor, causing the dispensing system with a dispense head to dispense a second set of beads of extruded core-sheath filament to the target substrate according to the second bead application plan.

2. The method of claim 1, further comprising: receiving signals from a scanning apparatus to define the substrate topography.

3. The method of claim 2, wherein the substrate topography additionally includes indicia of surface energy irregularities associated with the substrate topography.

4. The method of claim 3, wherein the surface energy irregularities includes the presence of an oil-based liquid, the presence of moisture, or the presence of another contaminant.

5. The method of claim 3, wherein the bead application plan includes instructions specific to the surface energy irregularity.

6. The method of claim 1, wherein deficiencies associated with the dispensed first set of beads of core-sheath filament adhesive comprise deficiencies associated with a stop/start event or sputtering.

7. The method of claim 1, wherein deficiencies associated with the dispensed first set of core-sheath filament adhesive comprises volumetric anomalies, wherein the volume of adhesive sensed is inconstant with a target volume of adhesive.

8. The method of claim 1, wherein the application performance criteria define acceptable application conditions.

9. The method of claim 8, wherein the application performance criteria additionally define acceptable remedial measures for deficiencies.

10. The method of claim 9, wherein the acceptable remedial measures specify bead augmentation.

11. The method of claim 1, wherein performance criteria specify whether bead augmentation is or is not allowable to address deficiencies.

12. The method of claim 1, wherein the performance criteria specify areas of the target substrate where adhesive is disallowed.

13. The method of claim 1, wherein the filament adhesive is a pressure sensitive adhesive.

14. The method of claim 13, wherein the filament adhesive is a core sheath adhesive.

15. The method of claim 1, wherein the dispensing head comprises:
a barrel including one or more heating elements;
an inlet extending through a side of the barrel for receiving the filament adhesive;
an outlet at a distal end of the barrel for dispensing the filament adhesive in molten form; and
a rotatable screw received in the barrel.

16. The method of claim 15, wherein the at least one mixing element comprises a plurality of posts disposed on a rotatable shaft.

17. The method of claim 14, wherein the core-sheath adhesive comprises a pressure-sensitive adhesive core that is viscoelastic at ambient temperature.

18. The method of claim 17, wherein the core-sheath adhesive comprises a sheath that is non-tacky at ambient temperature.

19. The method of claim 15, wherein the inlet comprises a beveled nip point defined in part by a front sidewall surface of the inlet that extends at an acute angle relative to a longitudinal axis of the rotatable screw.

20. The method of claim 19, wherein the acute angle is from 13 degrees to 53 degrees.

* * * * *